US010295377B2

(12) United States Patent
Cusey et al.

(10) Patent No.: US 10,295,377 B2
(45) Date of Patent: May 21, 2019

(54) SYSTEMS AND METHODS PROVIDING SYNCHRONIZATION FOR MULTIPLE OPTICAL DETECTORS WHEREIN A RADIANT POWER DELIVERED TO A SECOND LIGHT DETECTOR FROM A FIRST LIGHT SOURCE IS AT LEAST 25 PERCENT OF RADIANT POWER DELIVERED TO A FIRST LIGHT DETECTOR FROM THE FIRST LIGHT SOURCE

(71) Applicant: TT Electronics Plc, Carrollton, TX (US)

(72) Inventors: James P. Cusey, Dallas, TX (US); Brent Hans Larson, Carrollton, TX (US); Troy Don Cook, Carrollton, TX (US)

(73) Assignee: TT ELECTRONICS PLC, Carrollton, TX (US)

( * ) Notice: Subject to any disclaimer, the term of this patent is extended or adjusted under 35 U.S.C. 154(b) by 84 days.

(21) Appl. No.: 15/472,492

(22) Filed: Mar. 29, 2017

(65) Prior Publication Data
US 2018/0283906 A1 Oct. 4, 2018

(51) Int. Cl.
*G01J 1/36* (2006.01)
*G01D 5/30* (2006.01)
*G01D 18/00* (2006.01)

(52) U.S. Cl.
CPC ............ *G01D 5/30* (2013.01); *G01D 18/00* (2013.01)

(58) Field of Classification Search
CPC .. G01J 1/36; G01V 8/20; G01D 18/00; G01D 5/30
(Continued)

(56) References Cited

U.S. PATENT DOCUMENTS 3,705,316 A 12/1972 Burrous et al.
4,794,248 A * 12/1988 Gray .................. G01V 8/20
187/317
(Continued)

FOREIGN PATENT DOCUMENTS

CN 106463026 2/2017
EP 2161549 3/2010
(Continued)

OTHER PUBLICATIONS

Amanpreet Kaur et al., "Current Mode Computational Circuits for Analog Signal Processing," www.iiareeie.com, vol. 3, Issue 4, Apr. 2014, 9 pages.
(Continued)

*Primary Examiner* — Que Tan Le
(74) *Attorney, Agent, or Firm* — Haynes and Boone, LLP

(57) ABSTRACT

An optical detection system includes a first device that has a first light source and a first light detector, and a second device that has a second light source and a second light detector. The first and second devices are configured to turn on and off the first and second light sources periodically based on first and second control signals, respectively. The first and second light sources are configured not to emit light simultaneously. The first and second light sources emit light in wavelength ranges that overlap. The optical detection system further has the characteristic that when the first light source is turned on, a radiant power delivered to the second light detector from the first light source is at least 25 percent of a radiant power delivered to the first light detector from the first light source.

13 Claims, 11 Drawing Sheets

(58) Field of Classification Search
USPC .......................................................... 250/221
See application file for complete search history.

(56) References Cited

U.S. PATENT DOCUMENTS

| | | |
|---|---|---|
| 6,460,765 B1 | 10/2002 | Priesbsch |
| 7,286,123 B2 | 10/2007 | Yang |
| 7,509,113 B2 | 3/2009 | Knoedgen |
| 8,188,878 B2 | 5/2012 | Pederson et al. |
| 9,544,976 B2 | 1/2017 | Snyder et al. |
| 2007/0171146 A1 | 7/2007 | Lee et al. |
| 2016/0044760 A1 | 2/2016 | Robert |

FOREIGN PATENT DOCUMENTS

| | | |
|---|---|---|
| JP | 20100068520 | 3/2010 |
| TW | 201526558 | 7/2015 |

OTHER PUBLICATIONS

PCT Notification of Transmittal of the International Search Report and the Written Opinion of the International Searching Authority, or the Declaration (PCT/ISA/220), International Search Report (PCT/ISA/210), and the Written Opinion of the International Searching Authority, International Application No. PCT/US18/24179 dated Jun. 18, 2018, 8 pages.
Vishay Semiconductors, "Quad Channel Transmissive Optical Sensor With Phototransistor Outputs for Absolute and Incremental Encoding, TCUT1800X01," Rev. 1.1, Feb. 16, 2018, 8 pgs.

\* cited by examiner

SYSTEMS AND METHODS PROVIDING SYNCHRONIZATION FOR MULTIPLE OPTICAL DETECTORS WHEREIN A RADIANT POWER DELIVERED TO A SECOND LIGHT DETECTOR FROM A FIRST LIGHT SOURCE IS AT LEAST 25 PERCENT OF RADIANT POWER DELIVERED TO A FIRST LIGHT DETECTOR FROM THE FIRST LIGHT SOURCE

BACKGROUND

Light emitting diodes (LEDs) have been widely used in proximity sensing. In particular, LEDs have been paired with photodiodes in optical sensing systems. For example, an optical sensing system may drive an LED to emit light in certain wavelength range. This emitted light is received by a photodiode after going through a medium or being reflected by a surface. The photodiode converts the received radiant energy to electrical current which is further processed for detecting, for example, the existence of a moving object.

An optical sensing system may include multiple pairs of LEDs and photodiodes to form a sensing network for detecting an object's position, moving speed, and moving direction. For example, the sensing network may be installed along a track through which the object moves. Detection resolution and accuracy may require the multiple pairs of LEDs and photodiodes to be placed close to each other. Unfortunately, a photodiode may capture radiant power from nearby LEDs (interfering radiant power) in addition to the LED that the photodiode is paired with, causing false detection. For example, the interfering radiant power may falsely trigger the detection threshold of the photodiode and decreases the system sensing resolution. Such false detection may not be tolerated in high-resolution optical sensing systems. Accordingly, improvements in this area are desired.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
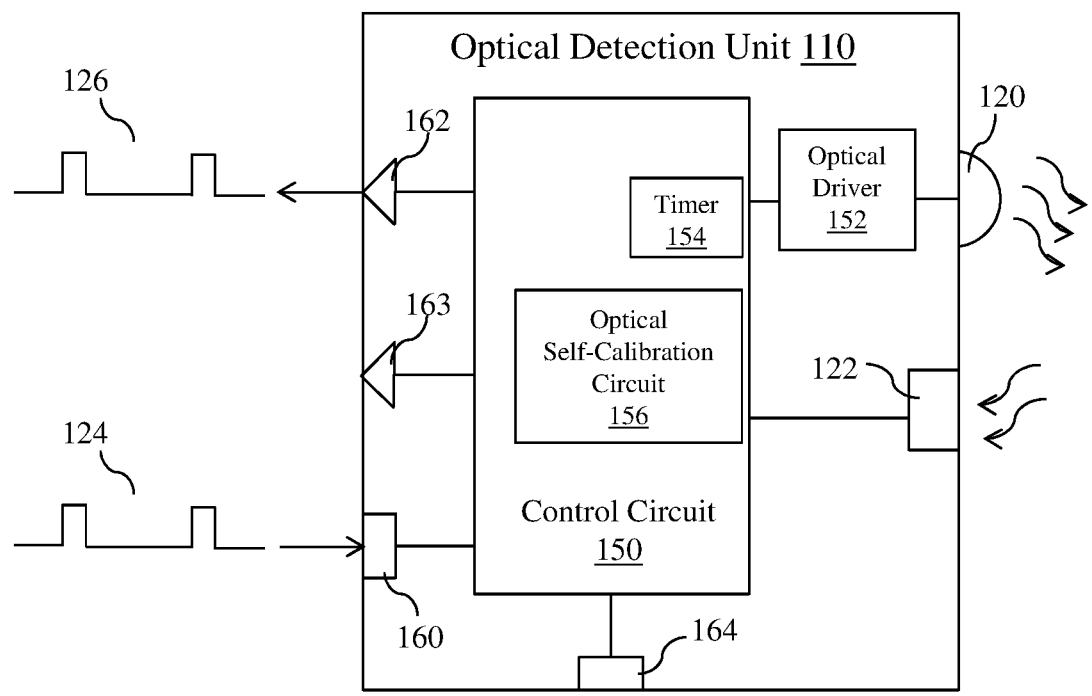
FIG. 1 is a simplified block diagram of an example optical detection unit according to aspects of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. Any alterations and further modifications to the described devices, systems, methods, and any further application of the principles of the present disclosure are fully contemplated as would normally occur to one having ordinary skill in the art to which the disclosure relates. For example, the features, components, and/or steps described with respect to one embodiment may be combined with the features, components, and/or steps described with respect to other embodiments of the present disclosure to form yet another embodiment of a device, system, or method according to the present disclosure even though such a combination is not explicitly shown. Further, for the sake of simplicity, in some instances the same reference numerals are used throughout the drawings to refer to the same or like parts.

The present disclosure is generally related to optical sensing systems and methods, more particularly to circuits, systems, and methods for synchronization of multiple optical detection units in order to detect the position and motion speed of a target object. For the purposes of simplicity, the embodiments described herein will use an optical detection unit that includes a light emitting diode (LED) as a light source and a photodiode as a light detector, although the scope of embodiments may include any suitable light sources or light detectors. For example, a phototransistor can also be used as a light detector in an optical detection unit.

Multiple optical detection units can be spaced to form some patterns, such as evenly spaced along a straight line. When an object, such as a piece of paper loaded in a label printer, moves past each of the optical detection units, light emitted from the LED will be temporally obstructed or damped and the photodiode will detect such optical variations. A timestamp associated with this event may also be recorded by each optical detection unit. From the known positions of the optical detection units, the object's position at a given recorded timestamp becomes known. From the distance between two adjacent optical detection units, $\Delta l$, and the time lapse between two respective recorded time stamps, $\Delta t$, the object's speed can be approximately deduced as $v=\Delta l/\Delta t$.

In certain applications, multiple optical detection units may be closely packed in space. In this specification, two optical detection units are said to be "closely packed" when an LED of one optical detection unit delivers to its neighboring, unpaired photodiode an amount of radiant power more than about 25% of the radiant power that it delivers to its paired photodiode. For example, two optical detection units may be installed in front of a probe head with a distance of less than 5 mm in between. When one optical detection unit turns on, its LED may deliver to the neighboring optical detection unit's photodiode an amount of radiant power more than 25% of what its own photodiode receives, such as 50% or even more. In this case, the two optical detection units are closely packed. Close packing may be a result of detection accuracy requirements or package size limitations. But of course, 25% of radiant power or 50% of radiant power are examples, and other embodiments may have a closely packed relationship that has 15% or 10% of radiated power picked up by a different detector than the one intended.

Further, multiple closely packed optical detection units may be manufactured according to the same specification in order to reduce manufacturing complexity and costs. Accordingly, the multiple closely packed LEDs emit light in similar spectrums or in spectrums that overlap. Consequently, interference to photodiodes may become severe. Such interference can be detrimental to certain high resolution optical detection systems. As merely an example, an optical detection system may be used to detect changes in light caused by the difference in transparency between a label affixed to a backing paper and the backing paper itself, which difference is quite small. In this example, the aforementioned interference might blur the boundary of the labels or trigger false detections.

Various embodiments provide optical sensing systems and topologies that reduce the interference from nearby LEDs and increase detection accuracy even when multiple detection units in the system are closely packed. A feature of some embodiments is to provide an optical sensing system that maintains low interference level and reduces average power consumption by grouping its optical detection units into zones and adjusting sensing durations in the respective zones. Yet another feature of some embodiments is to provide a sensing method that reduces interference from nearby LEDs in the optical sensing system and/or interference from ambient light as well as nearby LEDs.

Referring to FIG. 1, shown therein is a block diagram of an example optical detection unit 110 constructed according to an embodiment of the present disclosure. The optical detection unit 110 includes an LED 120. The LED 120 is driven by an optical driver 152 which generates a current flowing through the LED 120 when the LED 120 is turned on. The LED 120 produces a light (or radiant energy or radiant power) when it is on. The LED 120 may produce visible light or invisible light, including ultraviolet light and infrared light, or other appropriate wavelengths. The LED 120 may comprise any suitable semiconductor materials such as gallium arsenide (GaAs), aluminum gallium arsenide (AlGaAs), gallium phosphide (GaP), gallium arsenide phosphide (GaAsP), aluminum gallium phosphide (AlGaP), indium gallium nitride (InGaN), and aluminum gallium indium phosphide (AlGaInP).

The LED 120 outputs light directed towards a photodiode 122. The photodiode 122 receives at least a part of the radiant energy from the LED 120, for example, through transmission through a medium, reflection off a surface, or diffraction by a medium. The particular embodiments of FIG. 1 are configured to detect the radiant energy reflected off a surface or diffracted by medium. Another example embodiment (not shown) may arrange the photodiode 122 to face the LED 120 with a space there between through which detected objects may move. Such an example embodiment would be configured to detect transmission of light through a medium. In response, the photodiode 122 produces a current. The amplitude of the current is proportional to the radiant power received by the photodiode 122. This current is sensed by a control circuit 150 to compare with thresholds for further processing. The control circuit 150 also controls the optical driver 152 to drive the LED 120. In some embodiments, the photodiode 122 also has a lens (not shown) in front of it. The lens provides optical gain to the photodiode 122.

Still referring to FIG. 1, the control circuit 150 may be implemented as an Application Specific Integrated Circuit (ASIC) executing logic to perform the actions indicated in a memory of the control circuit 150. However, the scope of embodiments may include any kind of logic circuit, such as a general-purpose central processing unit, executing machine-readable code to perform optical detection. The control circuit 150 may include a timer 154. The timer 154 is coupled to the optical driver 152 and determines the duration for which the LED 120 is turned on or off by counting a pre-set for pre-programmed period of time. Depending on the timing accuracy and system complexity, the timer 154 may be an analog RC timer that each clock cycle is defined by an RC time constant, or a digital timer that includes flip-flops or a PLL with onboard crystal oscillator.

The optical detection unit 110 may further include an optical self-calibration circuit 156. For instance, the optical detection unit 110 may detect a slight change in the radiant power received by the photodiode 122. However, the change may be so small that variations in manufacturing of the optical detection unit 110 and variations in the environment may cause false detections. For example, variations in the LED 120's output or the photodiode 122's sensitivity, variations in the lens of the LED 120 or in the packages of the photodiode 122, variations in the placement of the LED 120 or the photodiode 122 within the optical detection unit 110, variations in ambient temperatures, etc., may each alone or in combination cause detection errors. In order to prevent detection errors due to these variations, it is desirable to calibrate the optical detection unit 110. Self-calibration may be initiated by a calibration control signal, such as by flipping signal polarity of a control pin or by changing an analog voltage level on a control pin (i.e. half voltage amplitude means to trigger self-calibration). Alternatively, self-calibration may be automatically executed upon powering on the optical detection unit 110. Self-calibration may be done by sweeping the output strength of the optical driver 152 and analyze the received power by the photodiode 122. An embodiment of self-calibration circuits and methods is described in the commonly-assigned U.S. patent application Ser. No. 15/170,511, filed Jun. 1, 2016, the entire disclosure of which is incorporated herein by reference.

Still referring to FIG. 1, optical detection unit 110 further includes a communication port 160. The communication port 160 allows external commands to be written to the control circuit 150, such as a control signal 124. In an embodiment, the communication port 160 includes a receiver, receiving commands from external devices. Data stream through the communication port 160 is unidirectional in this embodiment. In another embodiment, the communication port 160 includes a transceiver, and communication through the communication port 160 is bidirectional. In an embodiment, connection to communication port 160 can simply be a single wire. The communication port 160 can therefore be a single pin. In another embodiment, the connection to the communication port 160 is a differential line (or differential pair). The communication port 160 is therefore a port of dual pins in this embodiment. In yet another embodiment, connection to the communication port 160 can include a bus, such as an Inter-integrated Circuit (I²C) bus, a Serial Peripheral Interface (SPI) bus, or a Universal Asynchronous Receiver Transmitter (UART) bus, including RS-232/RS-422/RS-485 bus. To further this embodiment, the communication port 160 is a port compatible to respective bus specifications.

The optical detection unit 110 may further include an output port 162 and an identification port 164. The output port 162 can be connected to the communication port 160 of another optical detection unit 110 to form a daisy chain. The output port 162 is configured to generate a control signal 126 to the next optical detection unit 110 in the daisy chain. The identification port 164 can have a single pin or multiple pins (e.g., a bus). By writing to the identification port 164 (e.g., by strapping one or more pins to VCC or GND), the optical detection unit 110 may be flagged as a device positioned at one end of the daisy chain and to further function as a master device. The output port 162, identification port 164, and daisy chain connection will be collectively discussed later with reference to FIG. 3. The optical detection unit 110 may also include a detection indicator port 163. The detection indicator port 163 may send out signals indicating detection results, such as a logic "HIGH" when the optical detection unit 110 detects an event, or a logic "LOW", vice versa. In an embodiment, the detection indicator port 163 also sends out extra information, such as the timestamp information, when an event is detected. The detection indicator port 163 can have a single pin or multiple pins (e.g., a bus).

Still referring to FIG. 1, the optical detection unit 110 includes at least one LED 120 and one photodiode 122, but may include only part of or a sub-combination of the control circuit 150, the optical driver 152, the timer 154, the optical self-calibration circuit 156, the communication port 160, the output port 162, the detection indicator port 163, and the identification port 164, based on certain applications.

Figure 2:
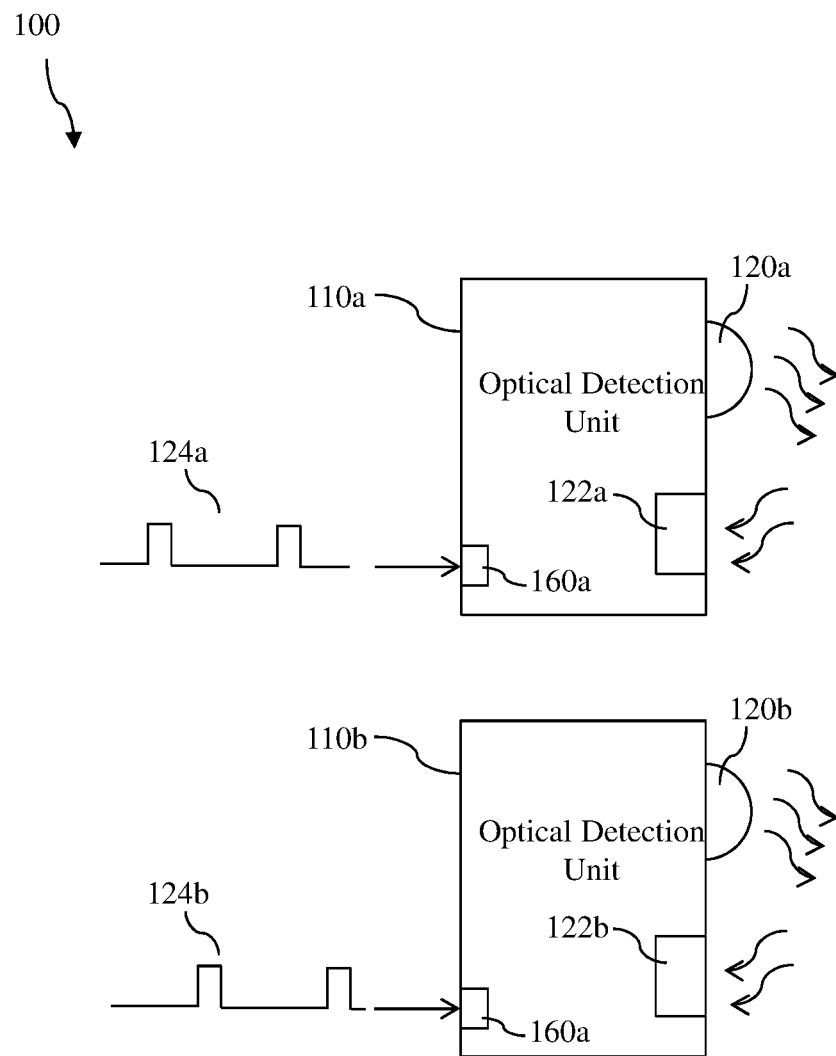
FIG. 2 is an illustration of an example optical sensing system for detecting an object's speed and position, using the optical detection unit in FIG. 1, according to aspects of the present disclosure.

FIG. 2 illustrates an example optical sensing (or detection) system 100, constructed according to an embodiment of the present disclosure. The optical sensing system 100 includes a plurality of optical detection units 110. The optical sensing system 100 may include any suitable number of optical detection units 110. For the purposes of simplicity, two optical detection units, 110a and 110b, are depicted in FIG. 2.

Referring to FIG. 2, according to the received control signal 124a (124b) through communication port 160a (160b), the optical detection unit 110a (110b) turns on or off the LED 120a (120b) as appropriate. The photodiode 122a (122b) may also be turned on or off together with the LED 120a (120b). In an embodiment, the optical detection unit 110a (110b) detects edges of the control signal 124a (124b), such as a rising edge or a falling edge, then turns on the LED 120a (120b) accordingly. Meanwhile the timer 154 (FIG. 1) in the optical detection unit 110a (110b) is triggered and starts a countdown. When the timer 154 finishes counting, it signals the respective optical driver 152 (FIG. 1) to turn off the LED 120a (120b). In another embodiment, the optical detection unit 110a (110b) detects duty cycles of the control signal 124a (124b). When the control signal 124a (124b) is logic "High", the optical detection unit 110a (110b) turns on LED 120a (120b); when the control signal 124a (124b) is logic "Low", the optical detection unit 110a (110b) turns off LED 120a (120b).

Still referring to FIG. 2, the optical detection units 120a and 120b are closely packed, and the LEDs 120a and 120b emit light in wavelength ranges that overlap. If the LEDs 120a and 120b emit light simultaneously, the photodiode 122a (122b) would receive not only radiant power from the LED 120a (120b), but also interfering radiant power from the neighboring LED 120b (120a). The interfering radiant power received by the photodiode 122a may be more than 25% of the radiant power received by the photodiode 122b from the LED 120b, while in some cases the percentage may be higher than 50%. To avoid the interfering radiant power in the optical sensing system 100, the control signals 124a and 124b are arranged in a way that the LEDs 120a and 120b would not be turned on simultaneously at any time interval in the present embodiment. When the optical detection unit 110a is performing an optical detection, the photodiode 122a receives only light emitted from the LED 120a, and LED 120b remains off during this time period, and vice versa. In this way, interfering radiant power is removed, and false detections by the optical sensing system 100 is reduced. In furtherance of the embodiment, LED 120b and photodiode 122b both remain off when optical detection unit 110a is performing an optical detection, thereby eliminate crosstalk from LED 120a to photodiode 122b as well.

Figure 3:
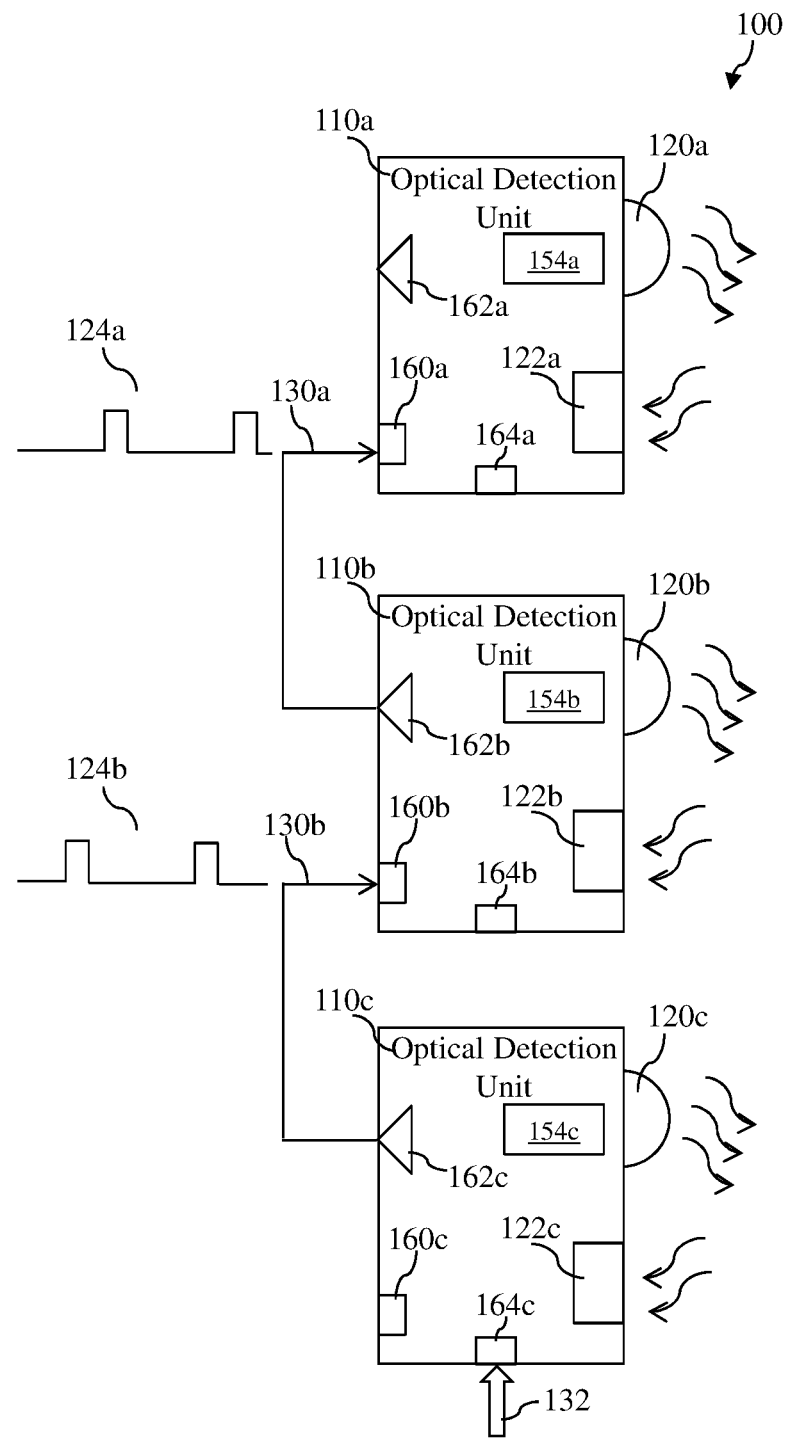
FIG. 3 is an illustration of an optical sensing system with an example daisy chain connection, based on the system in FIG. 2, in accordance with an embodiment.

FIG. 3 illustrates an embodiment of the optical sensing system 100 in an example daisy chain connection. For the purposes of simplicity, three optical detection units, 110a, 110b, and 110c, are depicted in FIG. 3 in the present embodiment. In various embodiments, the optical sensing system 100 may include any appropriate number of optical detection units 110. A daisy chain is formed by connecting the output port 162 of one optical detection unit 110 to the communication port 160 of the next optical detection unit 110 in the chain. In FIG. 3, the optical detection unit 110c is at one end of the daisy chain, and the optical detection unit 110a is at the other end of the daisy chain. The output port 162c connects to the communication port 160b. In the present embodiment, the connection is a single wire, such as the wire 130a and the wire 130b. Similarly, the output port 162b connects to the communication port 160a.

Still referring to FIG. 3, an identification signal 132 is written to the identification port 164c of the optical detection unit 110c. The signal 132 identifies the optical detection unit 110c as a master device in the optical sensing system 100. The other optical detection units, 110a and 110b, without receiving the identification signal 132, function as slave devices by default. In the present embodiment, the identification port 164c is a single pin and the identification signal 132 is a voltage signal, such as a logic "High," applied to the pin of the identification port 164c. In another embodiment, the identification port 164c is a bus port. The bus may be one of an I²C bus, an SPI bus, and a UART bus, including RS-232/RS-422/RS-485 bus. To further this embodiment, applying the identification signal 132 is by writing a memory unit in the detection unit (e.g., by bootstrapping) to indicate that it is a master device.

Figure 4:
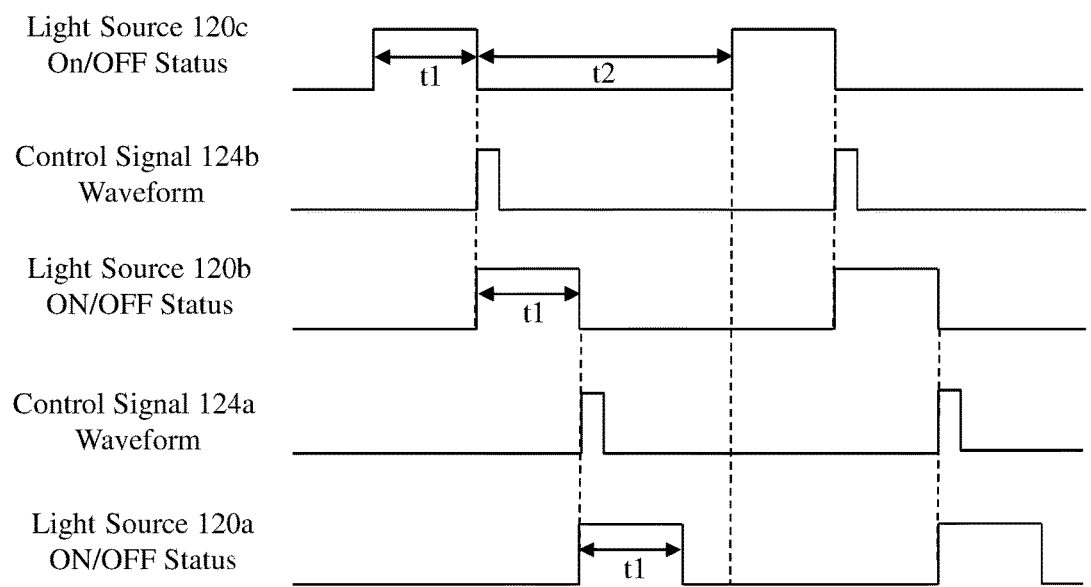
FIG. 4 is an example signal diagram of the system in FIG. 3, in accordance with an embodiment.

Referring to FIG. 4, shown therein is an exemplary timing diagram illustrating the actions of the optical sensing system 100 in FIG. 3. As a master device, the optical detection unit 110c first initiates optical detection by turning on the LED 120c. The timer 154c starts counting. Since the LEDs 120a and 102b are off, the photodiode 122c does not receive interfering radiant power from the LEDs 120a and 120b. After time $t_1$, the timer 154c finishes counting and the LED 120c is turned off. When the LED 120c is turned off, the output port 162c generates a pulse as the control signal 124b and sends it to the communication port 160b of the optical detection unit 110b. When the optical detection unit 120b detects a rising edge of the received pulse, the timer 154b starts counting, and the LED 120b is turned on. In another embodiment (not shown), the optical detection unit 120b detects a falling edge of the received pulse and triggers the timer 154b. Since the LEDs 120a and 102c are off, the photodiode 122b does not receive interfering radiant power from the LEDs 120a and 120c. After about time $t_1$, the timer 154b finishes counting and the LED 120b is turned off. When the LED 120b is turned off, the output port 162b generates a pulse as the control signal 124a and sends it to the communication port 160a of the optical detection unit 110a. When the optical detection unit 120a detects a rising edge of the received pulse, the timer 154a starts counting and the LED 120a is turned on. Since the LEDs 120b and 120c are off, the photodiode 122a does not receive interfering radiant power from the LEDs 120b and 120c. After about time $t_1$, the timer 154a finishes counting and the LED 120a is turned off. If there are more slave devices in the daisy chain, the output port 162a generates a pulse and delivers it to the next slave device. In this way, the pulse is propagating from one end of the daisy chain to another end of the daisy chain. To further this embodiment, when one LED is turned off, the associated photodiode in the same optical detection unit may also be turned off. Since there is at most one optical detection unit turned on during any time period, not only is the optical interference eliminated, the power consumption in the daisy chain is also reduced.

As a master device, the optical detection unit 110c is programmed to wait for each slave device to finish respective optical detection before initiating another round of optical detections. If there are n slave devices in the daisy chain, the optical detection unit 110c will wait $t_2 \geq n*t_1$ before turning on the LED 120c again. This timing can also be controlled by the timer 154c. In an embodiment, the daisy chain includes 6 slave devices and $t_2$ is around 250 microseconds (μs). In another embodiment, each optical detection unit 110 in the daisy chain includes an optical self-calibration circuit 156. In one example, self-calibration may be triggered by another pin or by using an analog level on a control pin. Self-calibration is not limited to those designs with a master controlling the LED, as it may be applied to any appropriate embodiment.

Figure 5:
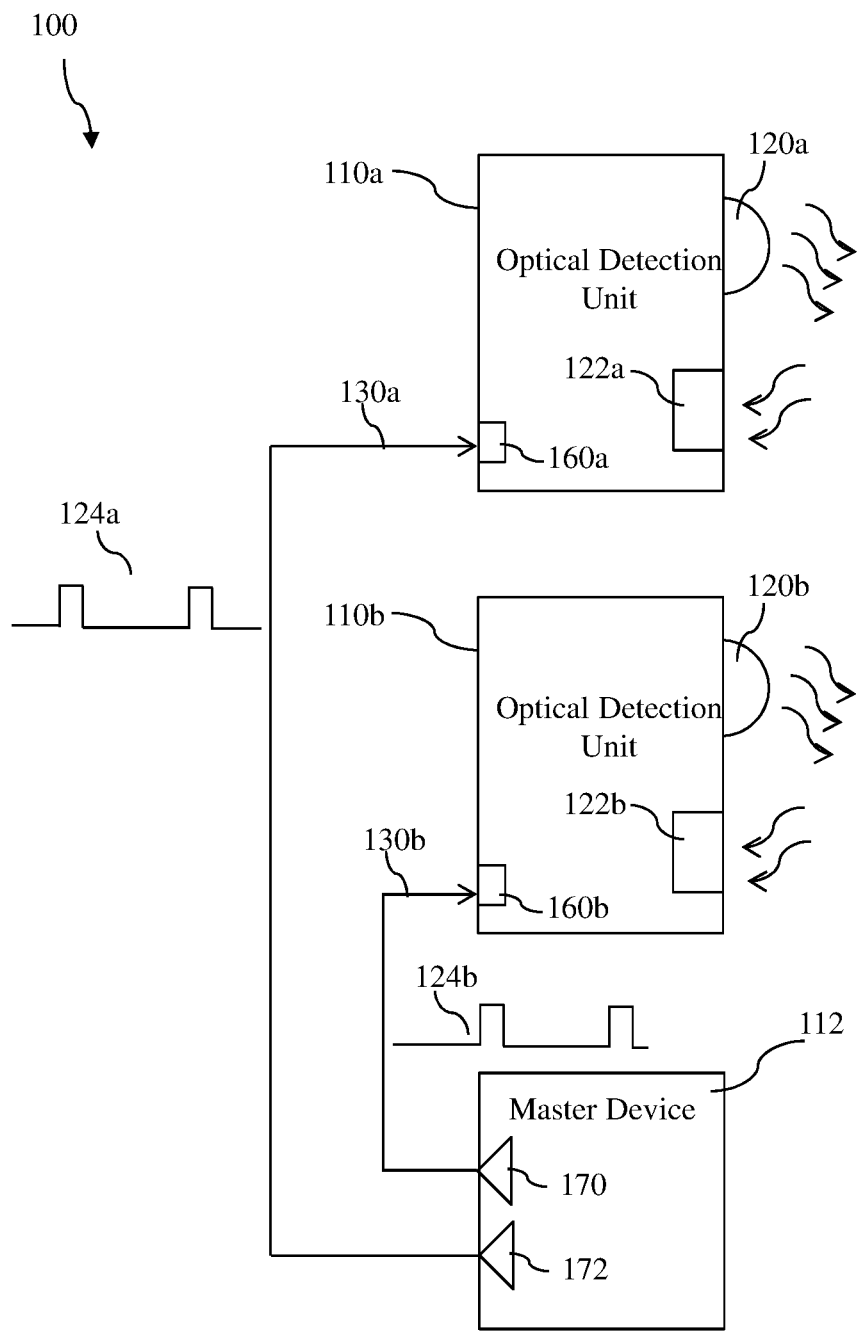
FIG. 5 is an illustration of an optical sensing system with an example star connection, based on the system in FIG. 2, in accordance with another embodiment.

FIG. 5 illustrates an embodiment of an optical sensing system 100 in an example star connection, where each of optical detection units 110a and 110b connects to a master device 112 which may also be an optical detection unit. For the purposes of simplicity, only two optical detection units, 110a and 110b, are depicted in FIG. 5. However, any appropriate number of optical detection units 110 may be connected to the master device 112 in a star connection. The master device 112 has control ports for each of the optical detection units individually. In the depicted example, the master device 112 has a control port 170 coupled to the communication port 160b of the optical detection unit 110b, and a control port 172 coupled to the communication port 160a of the optical detection unit 110a. In the present embodiment, each connection from the control ports 170 and 172 is a single wire, such as the wire 130b and the wire 130a, respectively. The master device 112 controls the timing for each optical detection unit, i.e., each optical detection unit turns on its LED at the control of the master device 112. In the present embodiment, the master device 112 only provides timing information and does not store any calibration information of each optical detection unit.

Figure 6:
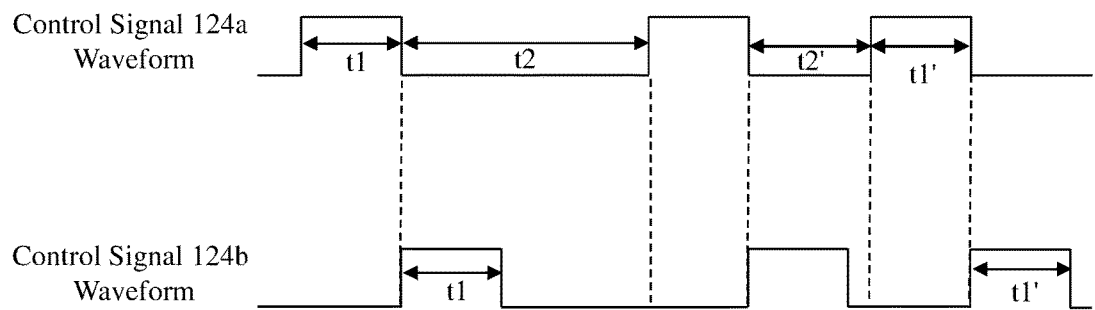
FIG. 6 is an example signal diagram of the system in FIG. 5, in accordance with an embodiment.

FIG. 6 illustrates an exemplary timing diagram for the control signals sent from the master device 112 in a star connection. The logic "High" and "Low" of a control signal directly controls the on and off of an LED, respectively. When the control signal 124a goes logic "High", the optical detection unit 110a turns on the LED 120a. At the same time, the control signal 124b remains logic "Low," and the LED 120b is not turned on. Since the LED 120a is the only LED turned on during this period in the optical sensing system 100, the photodiode 122a does not receive interfering radiant power from other LEDs in the system. After a time period of $t_1$, the control signal 124a goes logic "Low," and the optical detection unit 110a turns off the LED 120a. Next, the control signal 124b goes logic "High," and the optical detection unit 110b turns on the LED 120b. At this time, the LED 120b is the only LED that is turned on in the system 100. After a time period of $t_1$, the control signal 124b goes logic "Low," and the optical detection unit 110b turns off the LED 120b. The master device 112 sequentially sends control signals to each optical detection unit. The master device 112 is programmed to wait until each optical detection unit has finished respective optical detection before initiating another round of optical detection. If there are n optical detection units connected with the master device 112, the master device 112 will wait $t_2 \geq n*t_1$ before turning the control signal 124a to logic "High" again. The master device 112 may include a 1-to-N switch, a counter, and some other logic gates. Each optical detection unit 110 may include an optical self-calibration circuit 156.

An advantage of a star connection is that a master device may adaptably adjust the optical detection time $t_1$ or the scanning period time $t_2$ when needed. For example, when there is no object detected, the master device 112 can slow down the scanning period time $t_2$ to reduce power consumption. Once an optical detection unit detects a signal, the master device 112 shortens the scanning period time from $t_2$ to $t_2'$ to improve detection accuracy, as shown in FIG. 6. The optical detection time $t_1$ may also be shortened to $t_1'$.

Figure 7:
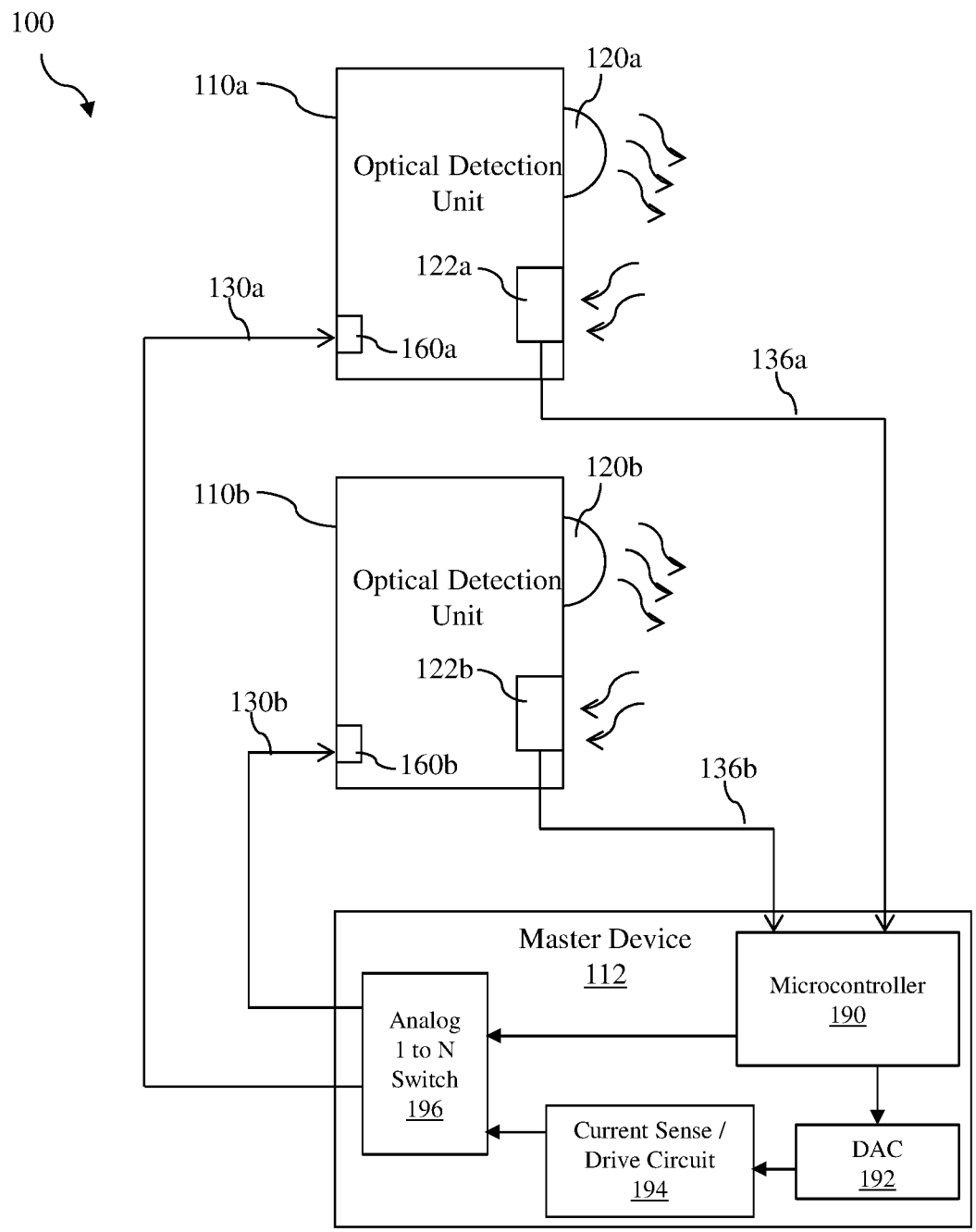
FIG. 7 is an illustration of an optical sensing system with an example star connection, based on the system in FIG. 2, in accordance with yet another embodiment.

FIG. 7 illustrates another embodiment of the optical sensing system 100 in an example star connection. Similar to the star connection illustrated in FIG. 5, the master device 112 controls each optical detection unit's LED by sending LED driving signals through an analog 1-to-N switch 196. Connection to the communication port 160a (160b) is a single wire. In this embodiment, the optical detection units 110a and 110b do not need to have the optical self-calibration circuit 156 and the optical driver 152. The master device 112 will calibrate each optical detection unit 110 individually and stores the calibration results in a memory of the master device 112. The master device 112 also integrates a current sense and drive circuit 194 that can adjust radiant power levels of the LEDs 120a and 120b. Since only one LED is turned on at any time, analog 1-to-N switch 196 is used to select which LED the current sense and drive circuit 194 drives. Outputs of the photodiodes 122a and 122b are coupled to a microcontroller 190. During the start-up of system 100, the master device 112 calibrates each optical detection unit similar to what has been described with the optical self-calibration circuit 156 in FIG. 1. In this embodiment, the optical detection unit 110 needs only the LED 120 and the photodiode 122, and the communication port 160 can be a single pin directly wired to drive the LED 120. The cost of each optical detection unit 110 can be greatly reduced.

Figure 8:
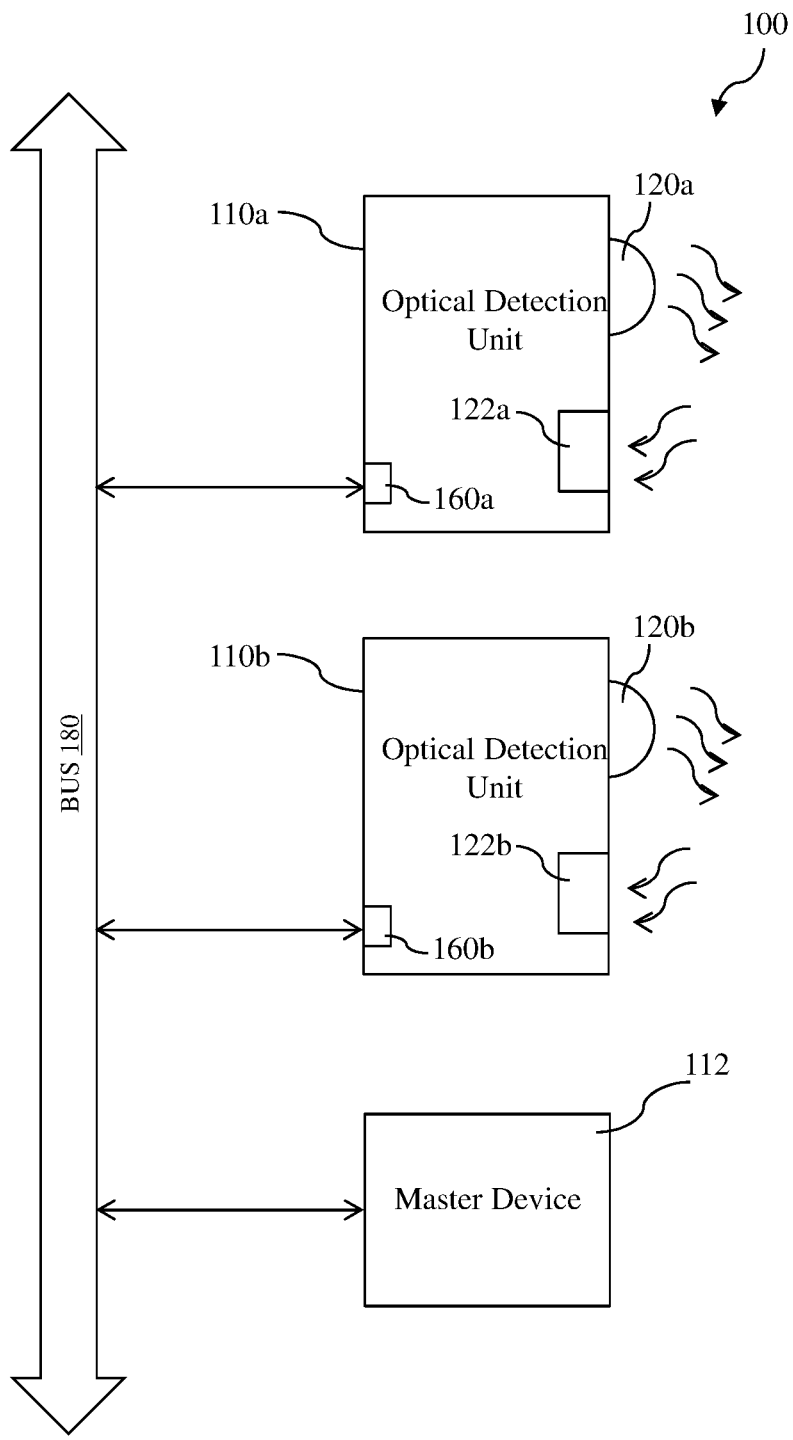
FIG. 8 is an illustration of an optical sensing system in an example bus connection, based on the system in FIG. 2, in accordance with an embodiment.

FIG. 8 illustrates an embodiment of the optical sensing system 100 in an example bus connection, where each optical detection unit 110 is coupled to a bus 180. For the purposes of simplicity, only two optical detection units, 110a and 110b, are depicted in FIG. 8. However, any appropriate number of optical detection units 110 may be coupled to the bus 180. The bus 180 may include a clock line and a data line, and may be one of an I²C bus, an SPI bus, and a UART bus, including an RS-232/RS-422/RS-485 bus. The communication port 160 is configured to be compatible with the specification of the bus 180. A master device 112 is coupled to the bus 180. The master device 112 provides a clock signal to the bus 180 if needed. The master device 112 sends control signals to optical detection units 120a and 120b through the bus 180. Each control signal includes a start bit plus a unique address for a target optical detection unit. Each optical detection unit is configured to look for a matching start bit plus a matching address and turns on or off its LED when this combination occurs. In this way, the master device 112 can make sure only one LED is turned on in the system 100 at any time period. To further this embodiment, when one LED is turned off, the associated photodiode in the same optical detection unit may also be turned off.

An advantage of a bus connection is that optical detection units can be divided into subgroups. Different subgroups can be placed in different zones and function at different time. For example, in a paper label loading dock, a plurality of optical detection units may be categorized as subgroup I and placed at an input of the loading dock, while another plurality of optical detection units may be categorized as subgroup II and placed at an output of the loading dock. A paper label always goes through the input before it reaches the output. Therefore, the master device 112 can keep the subgroup I active while leave the subgroup II inactive to save power until the subgroup I signals object detection. Only then does master device 112 turn on the subgroup II for object detection. The optical detection time $t_1$ and the scanning period time $t_2$ can also be adjusted in a bus connection.

Figure 9:
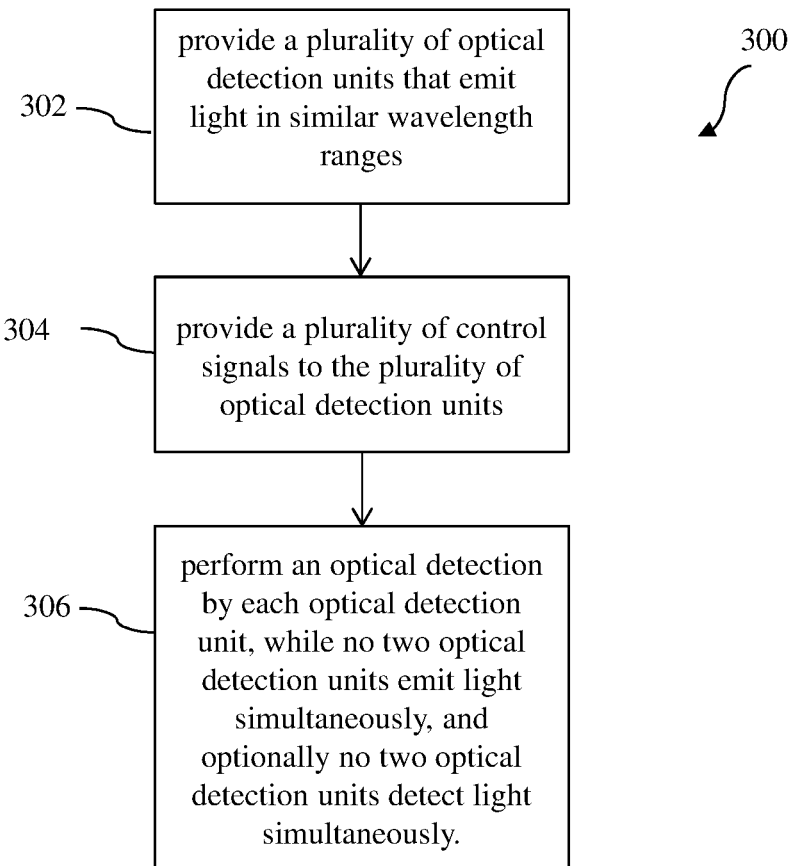
FIG. 9 shows a flow chart of an example method of optical detection of the optical sensing system in FIG. 2, in accordance with an embodiment.
Figure 10:
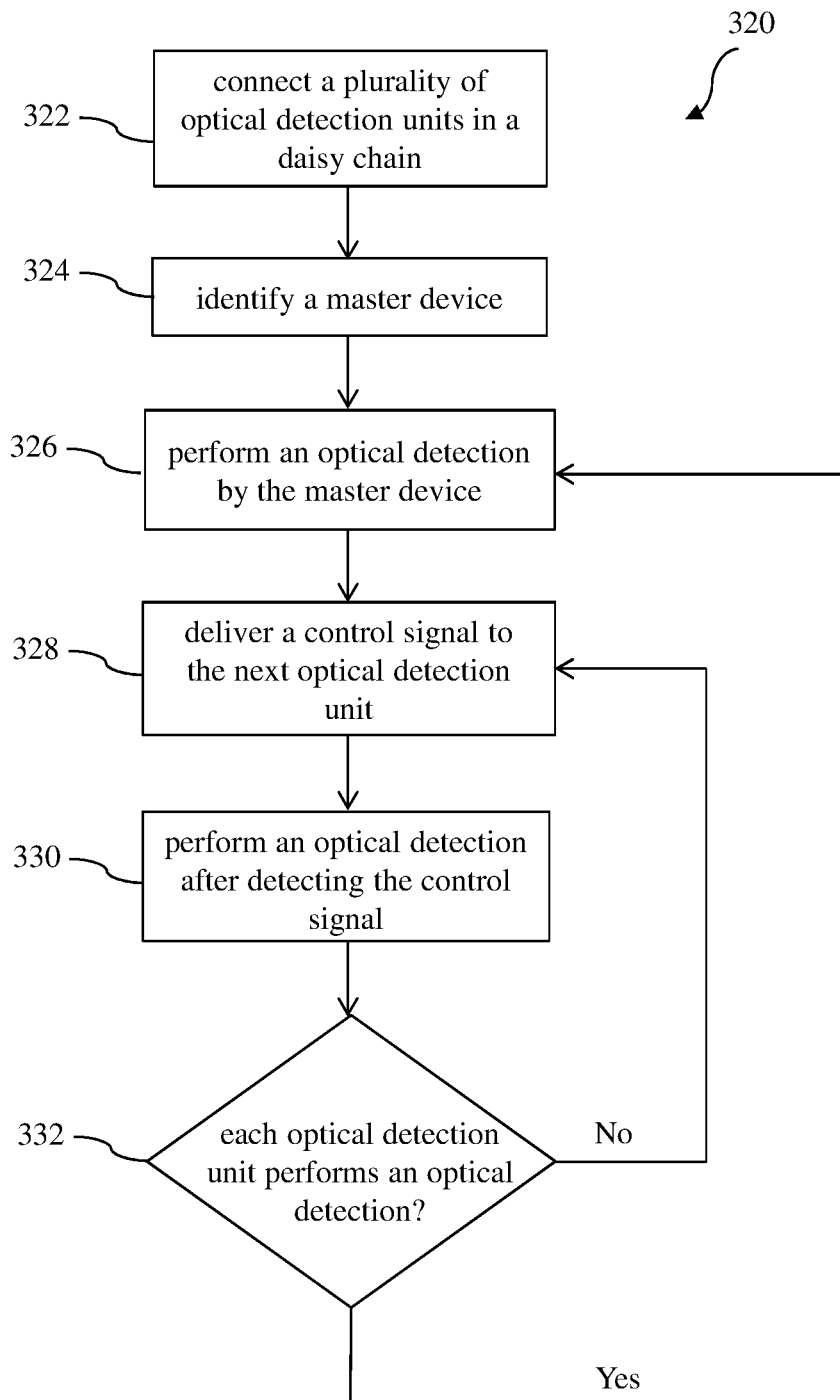
FIG. 10 shows a flow chart of an example method of optical detection of the optical sensing system in FIG. 3, in accordance with an embodiment.
Figure 11:
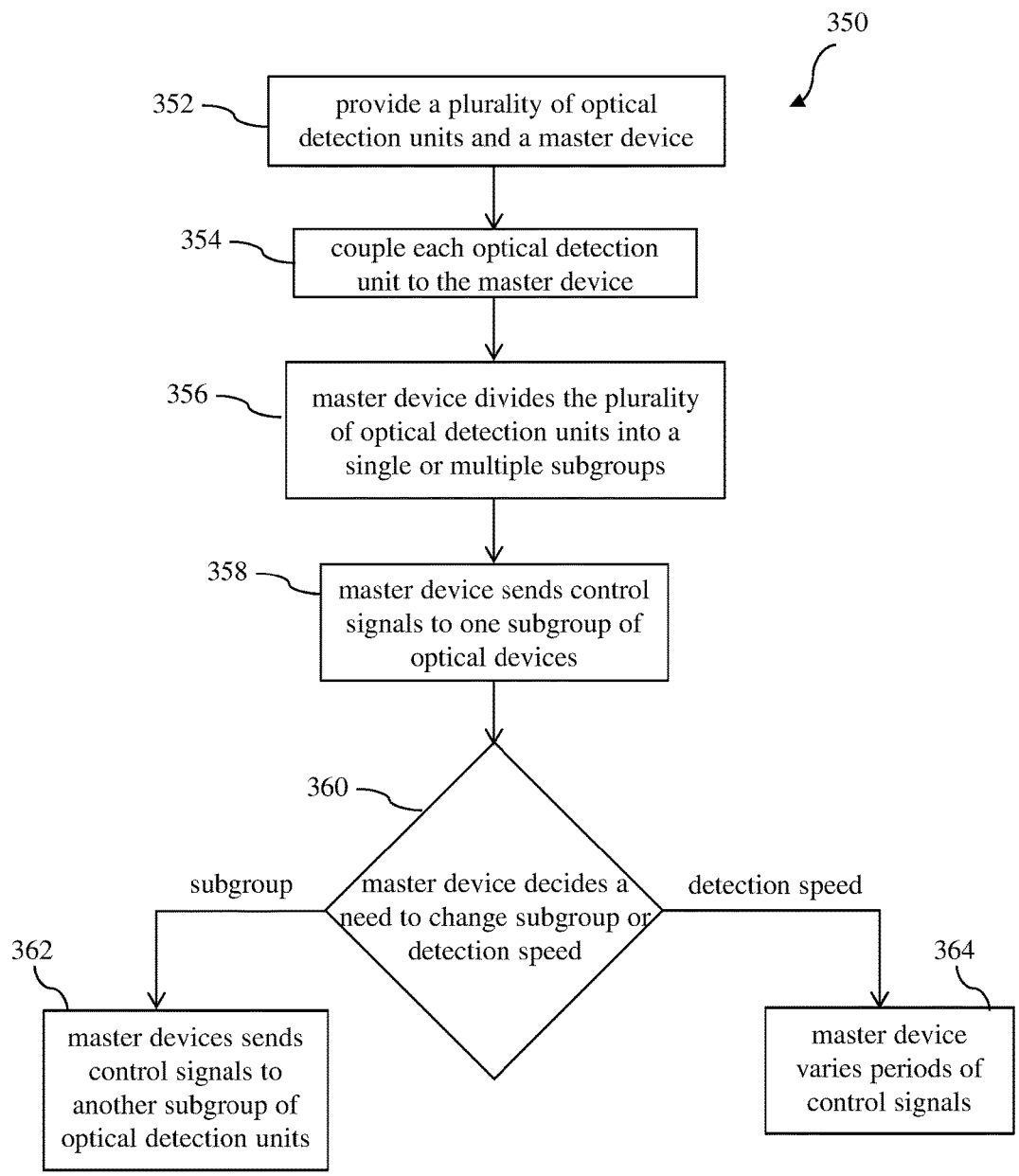
FIG. 11 shows a flow chart of an example method of optical detection of the optical sensing systems in FIGS. 5, 7, and 8, in accordance with some embodiments.

FIG. 9 illustrates a flow chart of a method 300 of optical detection. FIG. 10 illustrates a flow chart of a method 320 of optical detection by a system in a daisy chain configuration. FIG. 11 illustrates a flow chart of a method 350 of optical detection by a system in a star configuration or in a bus configuration. Each of the methods 300, 320, and 350 may be implemented, in whole or in part, by embodiments of the optical sensing system 100 discussed above. It is understood that additional operations can be provided before, during, and after each of the methods 300, 320, and 350, and some operations described can be replaced, eliminated, or moved around for additional embodiments of the methods. The methods 300, 320, and 350 are merely examples, and are not intended to limit the present disclosure beyond what is explicitly recited in the claims.

Referring to FIG. 9, at operation 302, the method 300 provides a plurality of optical detection units that emit light in similar wavelength ranges. Each of the plurality of optical detection units operates its light source based on a control signal received. At operation 304, the method 300 provides a plurality of control signals to the plurality of optical detection units. At operation 306, each optical detection unit performs an optical detection, while no two optical detection units emit light simultaneously. Therefore, no interfering light generated from light sources in the system. Optionally, no two optical detection units detect light simultaneously in the system, which may also help to reduce or eliminate crosstalk.

Referring to FIG. 10, at operation 322, the method 320 connects a plurality of optical detection units in a daisy chain (see 120a/120b/120c in FIG. 3). At operation 324, the method 320 identifies a master device (see 120c in FIG. 3). At operation 326, the master device performs optical detection (see FIG. 4). At operation 328, the master device delivers a control signal to the next optical detection unit (see 124b in FIG. 3). At operation 330, the slave device performs optical detection after detecting the control signal (see FIG. 4). At operation 332, if each optical detection unit has performed an optical detection, the method 320 returns to operation 326 to start a new round of optical detection. Otherwise, the method 320 returns to operation 328 and delivers a control signal from the current slave device to the next slave device.

Referring to FIG. 11, at operation 352, the method 350 provides a plurality of optical detection units and a master device (see FIGS. 5, 7, and 8). At operation 354, the method 350 couples each optical detection unit to the master device, resulting in a star connection or a bus connection. At operation 356, if it is a star connection, the method 350 keeps the plurality of optical detection units as one group; if it is a bus connection, the method 350 divides the plurality of optical detection units into multiple subgroups. At operation 358, the method 350 sends control signals to one subgroup of optical devices. The control signals allow only one LED to turn on at a time. At operation 360, based on an optical detection result, the method 350 decides whether to send control signals to another subgroup of optical detection units as in operation 362, or to adjust detection speed by varying intervals of control signals as in operation 364.

Although not intended to be limiting, one or more embodiments of the present disclosure provide many benefits to an optical sensing system using light sources and light detectors. As most optical sensing systems suffer from interference when optical detection units are closely packed, embodiments of the present disclosure provide circuits, system, and methods for reducing interference in the system. Advantageously, an optical sensing system according to aspects of the present disclosure has improved optical detection sensitivity. Various embodiments may be applicable to other types of light sources and light detectors besides LEDs and photodiodes.

In one exemplary aspect, the present disclosure is directed to an optical detection system for detecting object speed and position. The optical detection system includes a first device that has a first light source, such as a light emitting diode (LED), and a first light detector, such as a photodiode. The first device is configured to turn on and off the first light source periodically based on a first control signal received by the first device. The optical detection system further includes a second device that has a second light source, such as an LED, and a second light detector, such as a photodiode. The second device is configured to turn on and off the second light source periodically based on a second control signal received by the second device. The first light source and the second light source are configured not to emit light simultaneously. The first light source and the second light source emit light in wavelength ranges that overlap. The optical detection system further has the characteristic that when the first light source is turned on, a radiant power delivered to the second light detector from the first light source is at least about 25 percent of a radiant power delivered to the first light detector from the first light source.

In another exemplary aspect, the present disclosure is directed to an optical sensing system. The optical sensing system includes a plurality of optical devices, each of the plurality of optical devices having a light emitting diode (LED) and a photodetector. The optical sensing system further includes a first means for connecting the plurality of optical devices in a daisy chain. The optical sensing system further includes a second means for turning on the LED in each of the plurality of optical devices for a determined time. The optical sensing system further includes a third means for generating a pulse after turning off the LED in each of the plurality of optical devices. The optical sensing system also includes a fourth means for propagating the pulse from one end of the daisy chain to another end of the daisy chain.

In yet another exemplary aspect, the present disclosure is directed to a method of optical detection. The method includes providing two devices that are connected with a single wire, wherein each of the two devices has an optical generator, an optical detector, and an input port, identifying a master device from the two devices by writing to the input port of one of the two devices, resulting in the other one of the two devices as a slave device, performing a first optical detection by the master device, and delivering a pulse by the master device to the slave device, wherein the pulse is generated after the first optical detection is finished. The method further includes detecting an edge of the pulse by the slave device, performing a second optical detection by the slave device after the detecting of the edge, and performing a third optical detection by the master device after the second optical detection is finished, wherein the optical generators of the master and slave devices emit light in wavelength ranges that overlap and the optical detector of the slave device receives a radiant power that is at least 25 percent of a radiant power received by the optical detector of the master device during the first optical detection.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical detection system for detecting object speed and position, comprising:
    a first device, the first device having a first light source and a first light detector, wherein the first device is configured to turn on and off the first light source based on a first control signal received by the first device; and
    a second device, the second device having a second light source and a second light detector, wherein the second device is configured to turn on and off the second light source based on a second control signal received by the second device, wherein:
        the first light source and the second light source are configured to emit light during respective, non-overlapping time periods;
        the first light source and the second light source are configured to emit light in wavelength ranges that overlap; and
        when the first light source is turned on, a radiant power delivered to the second light detector from the first light source is at least 25 percent of a radiant power delivered to the first light detector from the first light source.

2. The optical detection system of claim 1, wherein:
    each of the first and second light sources comprises a light emitting diode (LED); and
    each of the first and second light detectors comprises one of: a photodiode and a phototransistor.

3. The optical detection system of claim 1, wherein:
    the first device is configured to turn on and off both the first light source and the first light detector; and
    the second device is configured to turn on and off both the second light source and the second light detector.

4. The optical detection system of claim 1, further comprising:
    a third device, the third device having a third light source and a third light detector, wherein the third device is configured to turn on and off the third light source periodically, wherein:
        the first device is configured to receive the first control signal from the third device through a first connection between the first device and the third device; and
        the second device is configured to receive the second control signal from the first device through a second connection between the second device and the first device.

5. The optical detection system of claim 4, wherein:
    each of the first and second connections comprises a single wire; and
    each of the first and second control signals comprises a pulse.

6. The optical detection system of claim 5, wherein:
    the third device is configured to send the first control signal after the third device turns off the third light source;
    the first device is configured to turn on the first light source after the first device detects a rising edge of the first control signal;
    the first device is configured to send the second control signal after the first device turns off the first light source; and
    the second device is configured to turn on the second light source after the second device detects a rising edge of the second control signal.

7. The optical detection system of claim 1, further comprising:
    a third device, the third device having a first control signal transmitter and a second control signal transmitter, wherein:
        the first control signal transmitter has a first connection with the first device; and
        the second control signal transmitter has a second connection with the second device.

8. The optical detection system of claim 7, wherein:
    the first device is configured to turn on the first light source when the first device receives the first control signal sent from the first control signal transmitter; and
    the second device is configured to turn on the second light source when the second device receives the second control signal sent from the second control signal transmitter.

9. The optical detection system of claim 8, wherein:
    each of the first and second connections comprises a single wire; and
    each of the first and second control signals comprises a pulse.

10. The optical detection system of claim 9, wherein each of the first and second devices has an optical self-calibration circuit.

11. The optical detection system of claim 9, wherein:
    an amplitude of each of the first and second control signals determines a radiant power emitted from each of the respective first and second light sources;
    the third device is configured to adjust the amplitudes of the first and second control signals to calibrate the respective first and second devices; and
    the third device is configured to store calibration results in a memory of the third device.

12. The optical detection system of claim 1, further comprising:
- a bus, each of the first and second devices coupled to the bus; and
- a third device, the third device coupled to the bus, wherein:
    - the third device is configured to send the first and second control signals to the bus separately, the first control signal containing address bits associated with the first device, the second control signal containing address bits associated with the second device.

13. The optical detection system of claim 12, wherein the bus is one of an Inter-integrated Circuit (I2C) bus, a Serial Peripheral Interface (SPI) bus, and a Universal Asynchronous Receiver Transmitter (UART) bus.

* * * * *